(12) United States Patent
Suzuki

(10) Patent No.: US 8,990,468 B2
(45) Date of Patent: Mar. 24, 2015

(54) I/O CONNECTION SYSTEM, METHOD AND PROGRAM

(75) Inventor: Jun Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 1140 days.

(21) Appl. No.: 12/736,808

(22) PCT Filed: May 14, 2009

(86) PCT No.: PCT/JP2009/059302
§ 371 (c)(1),
(2), (4) Date: Nov. 12, 2010

(87) PCT Pub. No.: WO2009/145098
PCT Pub. Date: Dec. 3, 2009

(65) Prior Publication Data
US 2011/0072182 A1 Mar. 24, 2011

(30) Foreign Application Priority Data
May 28, 2008 (JP) ................................ 2008-139315

(51) Int. Cl.
*G06F 13/40* (2006.01)
*G06F 9/44* (2006.01)

(52) U.S. Cl.
CPC .......... *G06F 13/4081* (2013.01); *G06F 9/4411* (2013.01); *G06F 2213/40* (2013.01)
USPC ............................ 710/302; 710/301; 713/100

(58) Field of Classification Search
CPC G06F 13/4081; G06F 9/4411; G06F 2213/40
USPC .......................................................... 710/302
See application file for complete search history.

(56) References Cited

U.S. PATENT DOCUMENTS

| 7,673,090 | B2* | 3/2010 | Kaushik et al. | 710/302 |
|---|---|---|---|---|
| 7,814,495 | B1* | 10/2010 | Lim et al. | 718/104 |
| 7,836,238 | B2* | 11/2010 | Freimuth et al. | 710/302 |
| 7,890,665 | B2* | 2/2011 | Corry et al. | 710/8 |
| 2003/0163611 | A1 | 8/2003 | Nagao | |
| 2007/0198763 | A1 | 8/2007 | Suzuki et al. | |
| 2008/0140866 | A1* | 6/2008 | Corry et al. | 710/8 |
| 2008/0147904 | A1* | 6/2008 | Freimuth et al. | 710/22 |
| 2009/0113422 | A1* | 4/2009 | Kani | 718/1 |
| 2009/0133016 | A1* | 5/2009 | Brown et al. | 718/1 |
| 2009/0133028 | A1* | 5/2009 | Brown et al. | 718/104 |

(Continued)

FOREIGN PATENT DOCUMENTS

| JP | H1-253995 A | 10/1989 |
|---|---|---|
| JP | 2000-172389 | 6/2000 |

(Continued)

OTHER PUBLICATIONS

Japanese Office Action dated Mar. 5, 2014, with English translation.

*Primary Examiner* — Ryan Stiglic
(74) *Attorney, Agent, or Firm* — McGinn IP Law Group, PLLC

(57) ABSTRACT

In execution of hot-plug processing consisting of a plurality of processing steps for connecting an I/O to a host, the hot-plug processing is temporarily stopped upon completion of predetermined processing steps in the hot-plug processing, and the hot-plug processing is resumed once it is detected that connection between the host and the I/O has been established and the host has been enabled to access the I/O.

18 Claims, 5 Drawing Sheets

(56) References Cited

U.S. PATENT DOCUMENTS

| | | | |
|---|---|---|---|
| 2009/0144731 A1* | 6/2009 | Brown et al. | 718/1 |
| 2009/0276773 A1* | 11/2009 | Brown et al. | 718/1 |
| 2010/0241767 A1* | 9/2010 | Corry et al. | 710/8 |
| 2010/0250786 A1* | 9/2010 | Corry et al. | 710/8 |
| 2011/0023030 A1* | 1/2011 | Lim et al. | 718/1 |
| 2011/0119423 A1* | 5/2011 | Kishore et al. | 710/302 |

FOREIGN PATENT DOCUMENTS

| | | |
|---|---|---|
| JP | 2000-194453 A | 7/2000 |
| JP | 2003-256349 | 9/2003 |
| JP | 2007-219873 | 8/2007 |

\* cited by examiner

I/O CONNECTION SYSTEM, METHOD AND PROGRAM

TECHNICAL FIELD

This invention relates to an I/O connection system connecting a plurality of hosts and one or a plurality of I/Os (input/output ports), and in particular to I/O hot-plugging and hot-removing in this type of I/O connection system.

BACKGROUND ART

Referring to FIG. 5, a conventional I/O connection system 300 will be described. The I/O connection system 300 is composed of hosts 1a and 1b, an Ethernet (registered trademark) switch 3, I/Os 6a and 6b, upstream PCI Express-Ethernet (registered trademark) bridges 7a and 7b (hereafter, referred to as upstream bridges 7a and 7b), a system manager 8, and downstream bridges 9a and 9b.

The host 1a has a CPU 15a, a memory 17a, a north bridge 16a for interconnecting the CPU 15a, the memory 17a and the upstream bridge 7a, a hot-plug processing unit 11a loaded in the CPU 15a as software to hot-plug the I/O 6a to the host 1a, and a hot-remove processing unit 12a loaded in the CPU 15a as software to hot-remove the I/Os 6a and 6b from the host 1a. The host 1b has a similar configuration.

The switch 3 interconnects the upstream bridges 7a and 7b and the downstream bridges 9a and 9b.

The I/Os 6a and 6b are assigned to the hosts 1a and 1b in response to their requests.

The upstream bridge 7a connects the host 1a and the Ethernet (registered trademark). The upstream bridge 7b connects the host 1b and the Ethernet (registered trademark).

The system manager 8 sets up connection between the upstream bridges 7a and 7b and the downstream bridges 9a and 9b.

The downstream bridge 9a connects the I/O 6a and the Ethernet (registered trademark). The downstream bridge 9b connects the I/O 6b and the Ethernet (registered trademark).

Next, description will be made of operation to enable the hosts to use the I/Os in the I/O connection system 300. Herein, description will be made of operation to enable the host 1a to use the I/O 6a by hot-plugging.

In response to input from a system administrator or control from a system management software, the system manager 8 uses a control frame to set up connection of the downstream bridge 9a to the upstream bridge 7a. As the result of this set-up of connection, the I/O 6a connected to the downstream bridge 9a is assigned to the host 1a connected to the upstream bridge 7a.

Upon receiving the control frame, the downstream bridge 9a requests an interruption to the CPU 15a of the host 1a to notify that the I/O 6a has been assigned to the newly connected host 1a. This interruption invokes the hot-plug processing unit 11a, and hot-plug processing is started.

In the hot-plug processing, the I/O 6a assigned to the host 1a is searched for, a device driver corresponding to the I/O 6a is loaded, and the assigned I/O 6a is registered in connection I/O information held by the host 1a.

The foregoing processing makes the assigned I/O 6a usable by the host 1a. The interruption to the CPU 15a performed by the downstream bridge 9a may be performed by the upstream bridge 7a to which the host 1a assigned with the I/O 6a is connected.

Next, description will be made of operation of the I/O connection system 300 when an I/O currently connected to a host is hot-removed. Herein, the description will be made of an example in which the I/O 6a connected to the host 1a is hot-removed and connected to the host 1b.

The upstream bridge 7a detects that the downstream bridge 9a connected thereto is connected to another upstream bridge 7b on the basis of a control packet from the system manager 8 and requests an interruption to the CPU 15a. This interruption invokes the hot-remove processing unit 12a and hot-remove processing is started.

In the hot-remove processing, the I/O 6a released from the assignment to the host 1a is searched for, the device driver corresponding to the I/O 6a is unloaded, and the I/O 6a released from the assignment is deleted from the connection I/O information held by the host 1a.

Japanese Laid-Open Patent Publication No. 2007-219873 is an example of prior art documents describing an invention relating to this invention.

DISCLOSURE OF THE INVENTION

Problems to be Solved by the Invention

According to the processing to hot-plug I/Os in the conventional I/O connection system, after receiving an instruction to start the hot-plug processing, time-consuming processing, for example, to turn on power to the I/O slot to activate the same is performed in response to the instruction, and then processing to load a device driver corresponding to the I/O and processing to update the connection I/O information held by the host are performed.

The group of processing steps constituting the hot-plug processing includes processing steps that can be executed and those that cannot be executed when no connection is established to the I/O to be hot-plugged.

This invention has been made in view of such circumstances, and a problem to be solved by the invention is to shorten the period of time from instruction to start the hot-plug processing to completion thereof.

Means for Solving the Problems

In order to solve the above-mentioned problem, this invention provides solutions as described below.

The invention provides an I/O connection system having a plurality of hosts interconnected via a network, and one or a plurality of I/Os. The I/O connection system is characterized by including hot-plug processing means (hot-plug processing unit 11) for executing hot-plug processing consisting of a plurality of processing steps for connecting the I/O to the host; stop instruction means (hot-plug synchronization unit 13) for instructing the hot-plug processing means to stop the hot-plug processing in response to completion by the hot-plug processing means of a first phase of the hot-plug processing consisting of predetermined one or a plurality of processing steps in the hot-plug processing; detection means (upstream bridge 2) for detecting that connection between the host and the I/O has been established and the host has been enabled to access the I/O; and start instruction means (hot-plug synchronization unit 13) for instructing, in response to the detection by the detection means, the hot-plug processing means to start a second phase of the hot-plug processing consisting of the other processing steps than those of the first phase of the hot-plug processing.

Another aspect of this invention provides an I/O connection system comprising a plurality of hosts interconnected via a network, and one or a plurality of I/Os, and the I/O connection system is characterized in that processing to hot-remove an I/O from a first host and processing to hot-plug this I/O to a second host different from the first host are at least partially executed in parallel.

Another aspect of this invention provides an I/O connection system having a plurality of hosts interconnected via a network, and one or a plurality of I/Os, and the I/O connection system is characterized by including: the I/O connection system being characterized by comprising: first detection means for detecting that, in hot-remove processing performed between a first host and an I/O, part of the hot-remove processing performed by the first host accessing the I/O has been completed (hot-remove notification unit of a switching source host) (step B); host switching means for switching the connection destination of the I/O from the first host to a second host different from the first host, in response to the detection by the first detection means (downstream bridge) (step B4); means for starting hot-plug processing between the second host and the I/O prior to completion of the entirety of the hot-remove processing in the first host (hot-plug synchronization unit) (step A2); stop means for stopping the hot-plug processing upon detecting completion of part of the hot-plug processing that is performed by the second host without accessing the I/O (hot-plug destination unit of a switching destination host) (step A3); second detection means for detecting that the second host has been enabled to access the I/O (upstream bridge of the switching destination host) (step A5); and means for resuming the hot-plug processing that has been stopped by the stop means, in response to the detection by the second detection means (hot-plug synchronization unit of the switching destination host) (step A7).

Further, another aspect of this invention provides an I/O connection method of connecting a host and an I/O in an I/O connection system having a plurality of hosts interconnected via a network, and one or a plurality of I/Os, and the I/O connection method is characterized by including: a stopping stage in which hot-plug processing consisting of a plurality of processing steps for connecting the I/O to the host is stopped in response to completion of a first phase of the hot-plug processing consisting of predetermined one or a plurality of processing steps in the hot-plug processing; a detection stage in which it is detected that connection between the host and the I/O has been established and the host has been enabled to access the I/O; and a starting stage in which, in response to the detection, a second phase of the hot-plug processing consisting of the other processing steps than those of the first phase of the hot-plug processing is started.

Further, another aspect of this invention provides an I/O connection method of connecting a host and an I/O in an I/O connection system having a plurality of hosts and one or a plurality of I/Os interconnected via a network, and the I/O connection method is characterized in that processing for hot-removing an I/O from a first host and processing for hot-plugging the I/O to a second host different from the first host are at least partially executed in parallel.

Another aspect of this invention provides an I/O connection method of connecting a host and an I/O in an I/O connection system having a plurality of hosts and one or a plurality of I/Os interconnected via a network, and the I/O connection method is characterized by including: a first detection stage in which it is detected that, in hot-remove processing performed between a first host and an I/O, part of the hot-remove processing that is performed by the first host accessing the I/O has been completed (hot-remove notification unit of a switching source host) (step B3); a host switching stage in which the connection destination of the I/O is switched from the first host to a second host different from the first host, in response to the detection in the first detection stage (downstream bridge) (step B4); a stage in which hot-plug processing between the second host and the I/O is started prior to completion of the entirety of the hot-remove processing in the first host (hot-plug synchronization unit) (step A2); a stopping stage in which the hot-plug processing is stopped upon detecting that part of the hot-plug processing that is performed without the second host accessing the I/O has been completed (hot-plug synchronization unit of a switching destination host) (step A3); a second detection stage in which it is detected that the second host has been enabled to access the I/O (upstream bridge of the switching destination host) (step A5); and a stage in which the hot-plug processing stopped in the stopping stage is resumed, in response to the detection in the second detection stage (hot-plug synchronization unit of the switching destination host) (step A7).

Still another aspect of this invention provides a program executed by a computer operating as a host of an I/O connection system having a plurality of hosts interconnected via a network and one or a plurality of I/Os. The program is characterized by causing the computer to function as: hot-plug processing means for executing hot-plug processing consisting of a plurality of processing steps for connecting the I/O to the host (hot-plug processing unit 11); stop instruction means for instructing the hot-plug processing means to stop the hot-plug processing in response to completion of a first phase of the hot-plug processing by the hot-plug processing means, the first phase of the hot-plug processing consisting of predetermined one or a plurality of processing steps in the hot-plug processing (hot-plug synchronization unit 13); and start instruction means for instructing the hot-plug processing means to start a second phase of the hot-plug processing consisting of the processing steps other than those of the first phase of the hot-plug processing (hot-plug synchronization unit 13), in response to detection by detection means for detecting that connection between the host and the I/O has been established and the host has been enabled to access the I/O (upstream bridge 2).

Advantageous Effects of the Invention

According to this invention, in a host to which an I/O is to be hot-plugged, time-consuming processing, for example, to turn on power to the I/O slot and to activate the same, is completed before the host is enabled to access the I/O, and thereafter the I/O is hot-plugged. This makes it possible to shorten the required time from instruction to start the hot-plug processing to completion thereof.

BEST MODE FOR CARRYING OUT THE INVENTION

This invention will be described based on exemplary embodiments thereof.

First Embodiment

Figure 1:
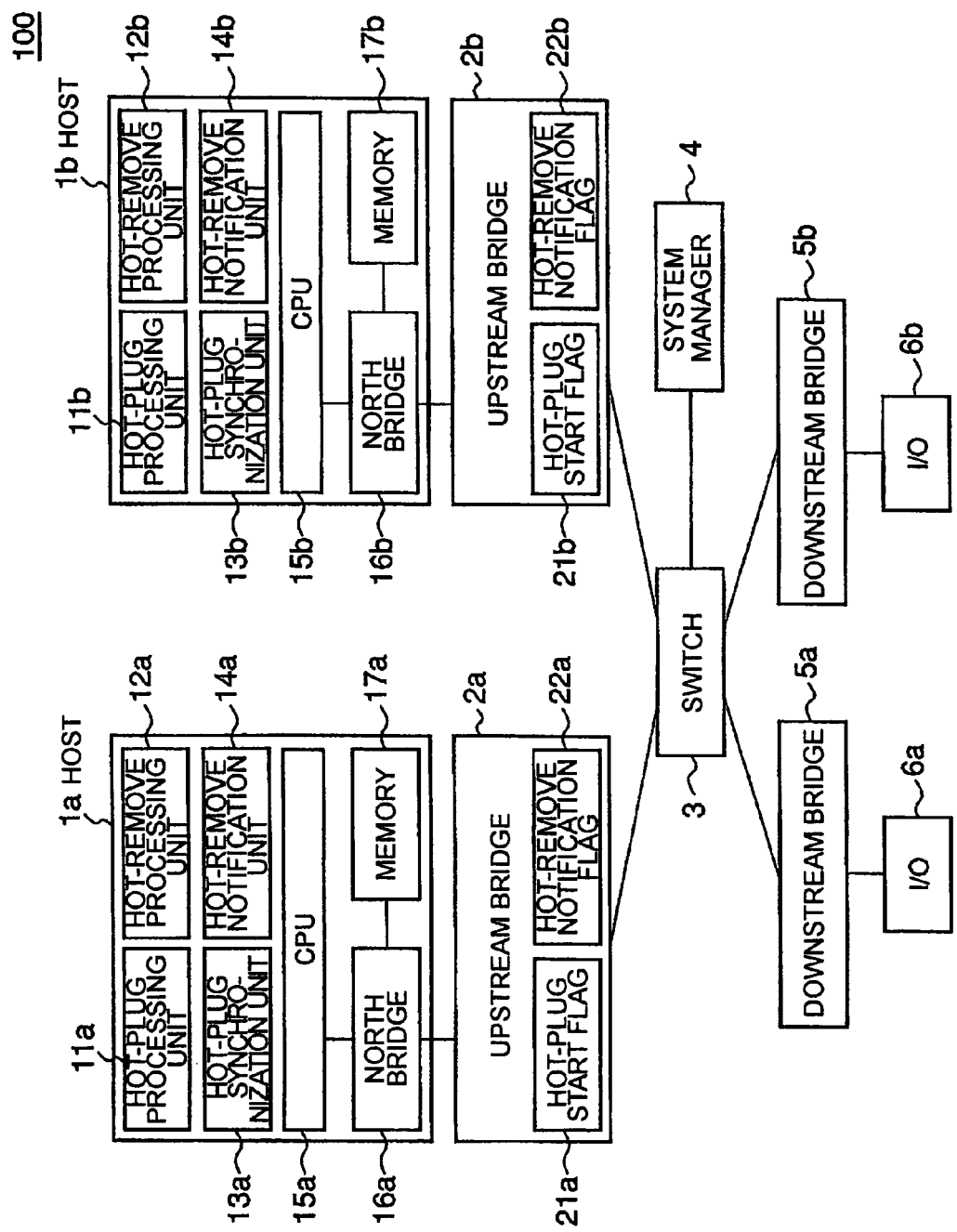
FIG. 1 is a block diagram for explaining an I/O connection system 100 constituting a first embodiment of this invention.

Description will be made of an I/O connection system 100 constituting a first embodiment of this invention. Referring to FIG. 1, the I/O connection system 100 is composed of hosts 1a and 1b, upstream PCI Express-Ethernet (registered trademark) bridges 2a and 2b (hereafter, referred to as the upstream bridges 2a and 2b), an Ethernet (registered trademark) switch 3 (hereafter, referred to as the switch 3), a system manager 4, downstream PCI Express-Ethernet (registered trademark) bridges 5a and 5b (hereafter, referred to as the downstream bridges 5a and 5b), and I/Os 6a and 6b.

The host 1a has a hot-plug processing unit 11a, a hot-remove processing unit 12a, a hot-plug synchronization unit 13a, a hot-remove notification unit 14a, a CPU 15a, a north bridge 16a, and a memory 17a. The hot-plug processing unit 11a, the hot-remove processing unit 12a, the hot-plug synchronization unit 13a, and the hot-remove notification unit 14a are programs which are loaded into and executed by the CPU 15a. The hot-plug processing unit 11a performs processing to hot-plug the I/O 6a or 6b to the host 1a. The hot-remove processing unit 12b performs processing to hot-remove the I/O 6a or 6b from the host 1a. The hot-plug synchronization unit 13a invokes the hot-plug processing unit 11a according to control from the system manager 4. The hot-plug synchronization unit 13a completes the operation which has been performed until just before the hot-plug processing unit 11a accesses the I/O 6a or 6b assigned to the host 11a, and stops the remaining operation of the hot-plug processing unit 11a. Further, the hot-plug synchronization unit 13a polls a hot-plug start flag 21a mapped in its own address space and, upon confirming assertion of the hot-plug start flag 21a, allows the hot-plug processing unit 11a to execute the remaining operation. The hot-remove notification unit 14a notifies the operation of the hot-remove processing unit 12a. The hot-remove notification unit 14a detects a step in which the access to the I/O 6a by the hot-remove processing unit 12a is completed and, in this step, the hot-remove notification unit 14a asserts a hot-remove notification flag 22a mapped in its own address space. The north bridge 16a interconnects the CPU 15a, the memory 17a and the upstream bridge 2a. The same applies to the host 1b The upstream bridge 2a connects the host 1a and the Ethernet (registered trademark). The upstream bridge 2a tunnels a TLP (Transaction Layer Packet) that is a PCI-Express packet between the downstream bridge 5a or 5b to which the upstream bridge 2a is connected and itself. The upstream bridge 2a has a hot-plug start flag 21a and a hot-remove notification flag 22a. The upstream bridge 2a detects, based on a control frame issued by the downstream bridge 5a or 5b, that the I/O 6a or 6b assigned to the host 1a becomes accessible, and asserts the hot-plug start flag 21a. On the other hand, when the hot-remove notification flag 22a is asserted by the hot-remove notification unit 14a, the upstream bridge 2a uses a control frame to instruct the downstream bridge 5a or 5b to move the I/O 6a or 6b, which has been assigned to the host 1a, to another host. The functions and configuration of the upstream bridge 2b are the same as those of the upstream bridge 2a and hence description thereof will be omitted.

The switch 3 connects the upstream bridges 2a and 2b and the downstream bridges 5a and 5b.

The system manager 4 sets up connection between the upstream bridges 2a and 2b and the downstream bridges 5a and 5b. When one of the hosts hot-removes the I/O based on control by the system manager or system management software, the system manager 4 notifies, using a control frame, the upstream bridge connected to the relevant host of the I/O to be hot-removed and the host to which the I/O is to be assigned next. Further, using a control frame, the system manager 4 preliminarily notifies the upstream bridge connected to the host to which the hot-removed I/O is to be assigned that the I/O is hot-plugged thereto, and causes the hot-plug synchronization unit of that host to start the hot-plug processing unit.

It is assumed, for example, that the I/O 6a is currently assigned to the host 1a and is going to be assigned to the host 1b. When the host 1a hot-removes the I/O 6a based on instruction from the system manager or system management software, the system manager 4 notifies, using a control frame, the upstream bridge 2a that the I/O 6a is to be hot-removed and the I/O 6a is then to be assigned to the host 1b. Further, using a control frame, the system manager 4 notifies the upstream bridge 2b that the I/O 6a is to be hot-plugged. Upon receiving this notification, the hot-plug synchronization unit 13 in the host 1b starts the hot-plug processing unit 11b.

The downstream bridge 5a connects the I/O 6a and the Ethernet (registered trademark). Likewise, the downstream bridge 5b connects the I/O 6b and the Ethernet (registered trademark). The downstream bridge 5a is connected to either one of the upstream bridges 2a and 2b. The upstream bridge to be connected can be changed by the control frame of the upstream bridge. The same applies to the downstream bridge 5b.

Each of the I/Os 6a and 6b is composed of an input/output port and computer peripheral equipment having an interface for connection to this port, and is assigned to the host 1a or 1b in response to a request. Specifically, the input/output port here is a PCIe port. The computer peripheral equipment may be one having a PCIe interface, and may be, for example, an auxiliary memory device such as a hard disk device and a magneto-optical disk device, or a network interface card.

Figure 2:
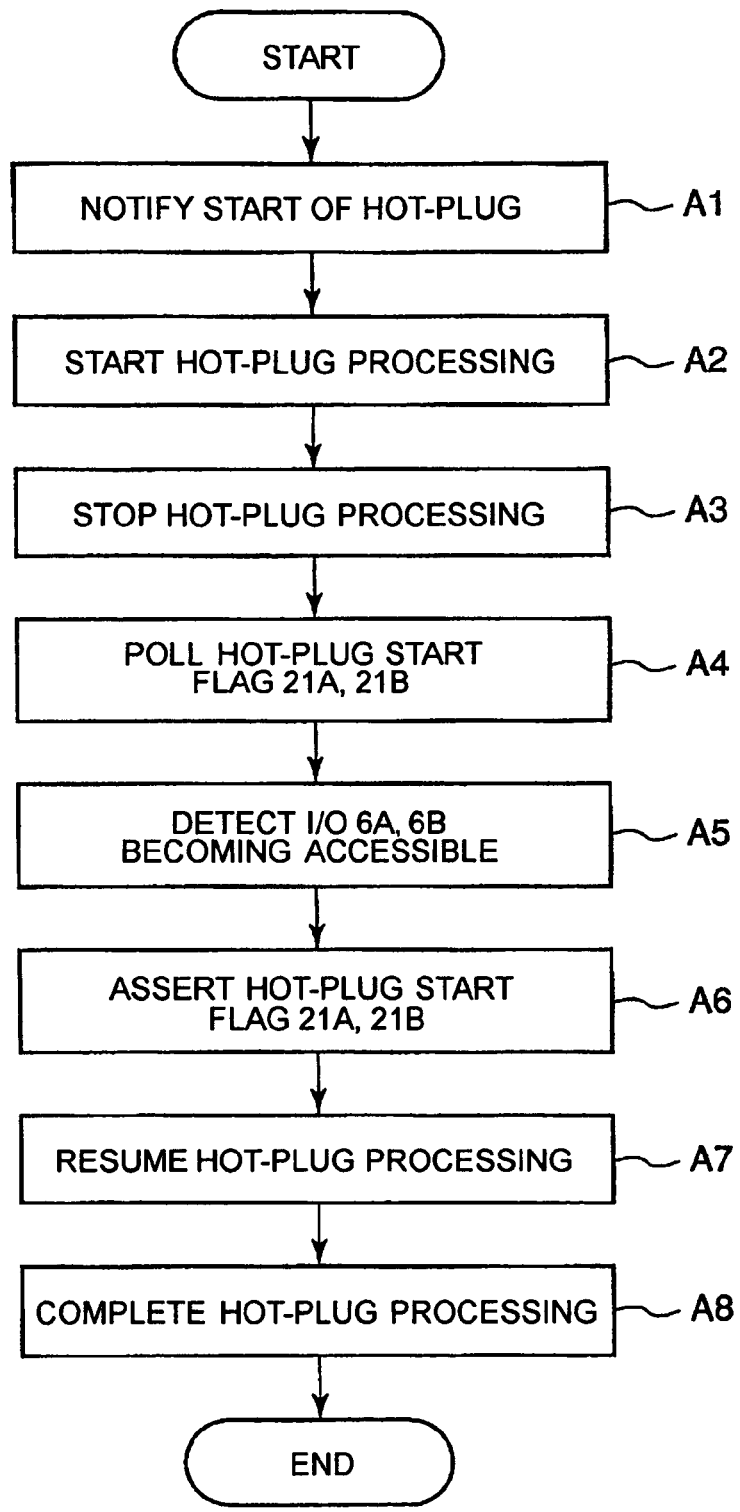
FIG. 2 is a flowchart for explaining hot-plug processing of the I/O connection system 100.

Next, description will be made of operation when an I/O is hot-plugged to a host in the I/O connection system 100, with reference to FIG. 2. The description here will be made of an example in which the I/O 6a is hot-plugged to the host 1a. The operation will be the same when the I/O 6b is hot-plugged to the host 1a, when the I/O 6a is hot-plugged to the host 1b, and when the I/O 6b is hot-plugged to the host 1b.

The upstream bridge 2a is notified by the system manager 4 using a control frame to start hot-plug processing in preparation for assignment of the I/O 6a (step A1).

The upstream bridge 2a invokes the hot-plug synchronization unit 13a by means of interruption. The invoked hot-plug synchronization unit 13a starts operation of the hot-plug processing unit 11a (step A2).

The hot-plug synchronization unit 13a completes the operation performed by the hot-plug processing unit 11a and stops the operation in that step until just before accessing the I/O 6a, so that the hot-plug processing unit 11a searches for the assigned I/O 6a (step A3). Prior to accessing the I/O 6a, the hot-plug processing unit 11a completes time-consuming processing for example to turn on power supply to the I/O slot to activate the same.

Subsequently, the hot-plug synchronization unit 13a polls the hot-plug start flag 21a (step A4). Since the hot-plug start flag 21a is mapped in the address space of the hot-plug synchronization unit 13a, no context switch cost is generated during the polling.

The upstream bridge 2a detects, on the basis of a control frame issued by the downstream bridge 5a connected to the assigned I/O 6a, that connection between the upstream bridge 2a and the downstream bridge 5a has been established and the I/O 6a has become accessible (step A5). The connection between the upstream bridge 2a and the downstream bridge 5a is completed by establishing a tunnel for transmitting and receiving a TLP.

Subsequently, the upstream bridge 2a asserts the hot-plug start flag 21a (step A6).

Upon detecting the assertion of the hot-plug start flag 21a, the hot-plug synchronization unit 13a instructs the hot-plug processing unit 11a to resume the processing. In response to this instruction, the hot-plug processing unit 11a executes a final part of the processing requiring access to the I/O 6a, loads a device driver corresponding to the I/O 6a, and updates the connection I/O information held by the host 1a (step A7). The device driver loaded herein is a device driver of computer peripheral equipment connected downstream of the PCIe port. The hot-plug processing is completed after these processing steps (step A8).

All or some of the processing steps in steps A2 to A8, as required, are executed on the CPU 15a by means of exclusive processing, so that a context switch to another processing is prevented. For example, the hot-plug processing unit 11a is preferably executed under an exclusive control after the processing is resumed.

Figure 3:
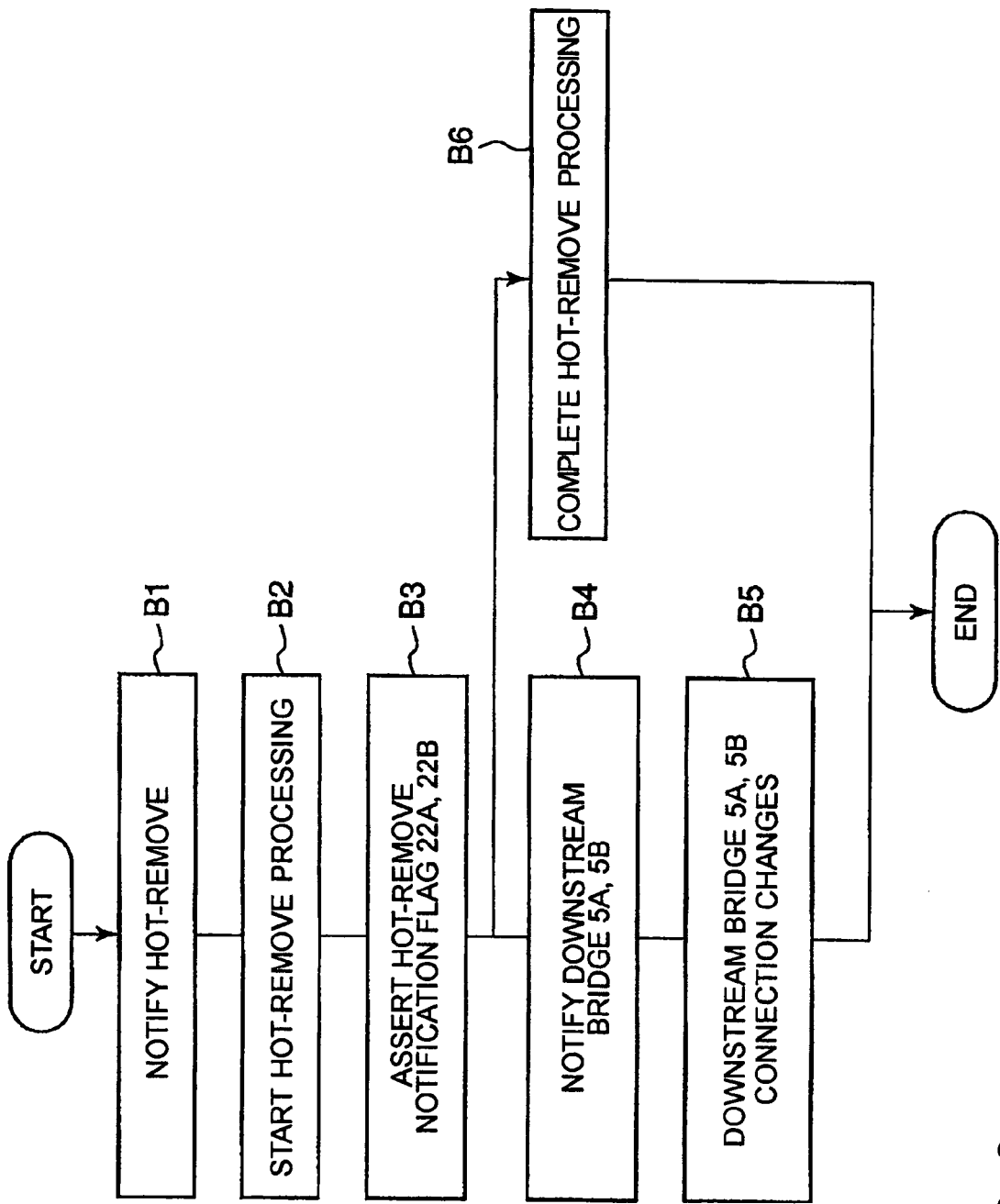
FIG. 3 is a flowchart for explaining hot-remove processing of the I/O connection system 100.

Next, description will be made of operation when an I/O is hot-removed from a host in the I/O connection system 100, with reference to FIG. 3. Herein, the description will be made of an example in which the I/O 6a connected to the host 1a is hot-removed. It is assumed that the hot-removed I/O 6a is then connected to the host 1b. The same applies when the I/O 6b is hot-removed from the host 1a, when the I/O 6a is hot-removed from the host 1b, and when the I/O 6b is hot-removed from the host 1b.

A tunnel for transmitting and receiving a TLP has been established between the upstream bridge 2a and the downstream bridge 5a.

The system manager 4 issues a control frame to the upstream bridge of a host to which the I/O to be hot-removed is currently connected, and notifies that the I/O is to be hot-removed and which host the I/O is next to be connected to (step B1). Since it is assumed here that the I/O 6a is hot-removed from the host 1a and connected to the host 1b, the system manager 4 issues a control frame to notify the upstream bridge 2a that the I/O 6a is to be hot-removed and the host 1b is the next connection destination of the I/O 6a.

In response to this control frame, the upstream bridge 2a requests an interruption to the CPU 15a to invoke the hot-remove processing unit 12a, and the hot-remove processing is started (step B2).

The hot-remove notification unit 14a detects the step in which the hot-remove processing unit 12a stops accessing the I/O 6a, and asserts the hot-remove notification flag 22a (step B3). Since the hot-remove notification flag 22a is mapped within the address space of the hot-remove notification unit 14a, no context switch cost is generated during the assertion.

All or some of the processing steps in steps B1 to B3 are executed as required on the CPU 15a by means of exclusive processing, so that context switch to another processing is prevented.

Upon the assertion of the hot-remove notification flag 22a by the hot-remove notification unit 14a, the upstream bridge 2a issues a control frame to the downstream bridge 5a which is connected to the I/O 6a the assignment of which is changed, to notify to start connecting to the host 1b to which the I/O 6a is to be assigned next (step B4).

Upon receiving the control frame, the downstream bridge 5a starts connection processing to connect the same to the upstream bridge 2b connected to the host 1b to which the I/O 6a is to be assigned, according to the control frame (step B5).

On the other hand, even after asserting the hot-remove notification flag 22a in step B3, the hot-remove processing unit 12 of the host 1a continues processing until the hot-remove processing is completed (step B6). After asserting the hot-remove notification flag 22a, the hot-remove processing unit 12a performs time-consuming processing for example to disable or turn off power to the I/O slot.

Next, description will be made of operation to switch over the host connected to the I/O by means of the above-described hot-plug processing and hot-remove processing. Herein, the description will be made of the case in which the I/O 6a connected to the host 1a is next connected to the host 1b.

The system manager 4 issues a control frame to the upstream bridge 2a on the side of the host 1a which the I/O 6a is currently connected to, and notifies that the I/O 6a is to be hot-removed and the host 1b is the next connection destination of the I/O 6a (step B1). Upon receiving this, the above-described hot-remove processing is performed between the host 1a and the I/O 6a.

At the same time as issuing the control frame to the upstream bridge 2a, the system manager 4 issues a control frame to the upstream bridge 2b to instruct the same to start hot-plug processing in preparation for assignment of the I/O 6a (step A1). In response to this, the above-described hot-plug processing is performed between the host 1b and the I/O 6a.

When the hot-remove processing unit 12a stops accessing the I/O 6a, the hot-remove notification unit 14a in the host 1a detects this, and asserts the hot-remove notification flag 22a. In response to the asserted hot-remove notification flag 2a, the upstream bridge 2a issues a control frame to the downstream bridge 5a to instruct connection to the host 1b.

On the other hand, in the host 1b, hot-plug processing is started in parallel with the hot-remove processing by the host 1a without waiting for completion of the hot-remove processing. A part of the hot-plug processing which does not necessarily require the access to the I/O 6a is performed first and then it is waited for that the I/O 6a becomes accessible. Once the hot-remove processing is completed in the host 1a and the host 1b is enabled to access the I/O 6a, the hot-plug processing is resumed.

In this manner, the period of time required for switching over the host to connect the I/O can be reduced by performing the hot-remove processing simultaneously in parallel with a part of the hot-plug processing.

According to this first embodiment, immediately after a host from which an I/O is to be hot-removed stops accessing the I/O, connection to a host to which the I/O is assigned next is started. Therefore, the processing does not wait for completion of time-consuming processing for example to disable or turn off power to the I/O slot. A flag used for synchronizing timing to hot-remove and hot-plug the I/O is mapped within a memory space of software for performing hot-remove and hot-plug processing, so that context switch to another processing is prevented. The software for hot-remove and hot-plug processing executes a part the processing or the entire of the processing from the start to the end thereof under exclusive control, if required, so that context switch to another processing is prevented. Thus, the hot-remove processing and the hot-plug processing can be performed in parallel by the respective hosts, which enables the hosts to rapidly hot-remove and hot-plug the I/O, leading to reduction of the down time of services using the I/O.

Second Embodiment

Figure 4:
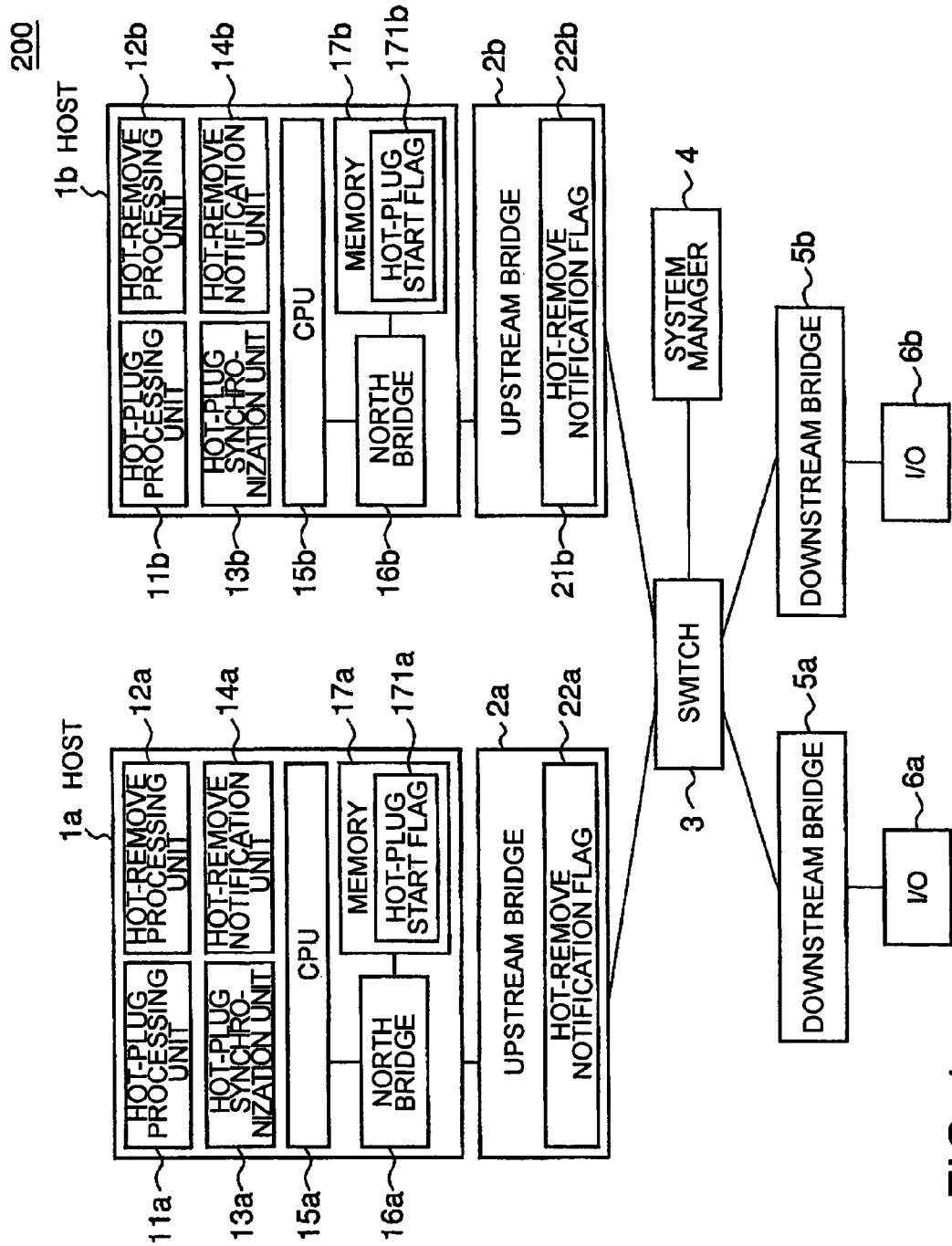
FIG. 4 is a block diagram for explaining an I/O connection system 200 constituting a second embodiment of this invention.
Figure 5:
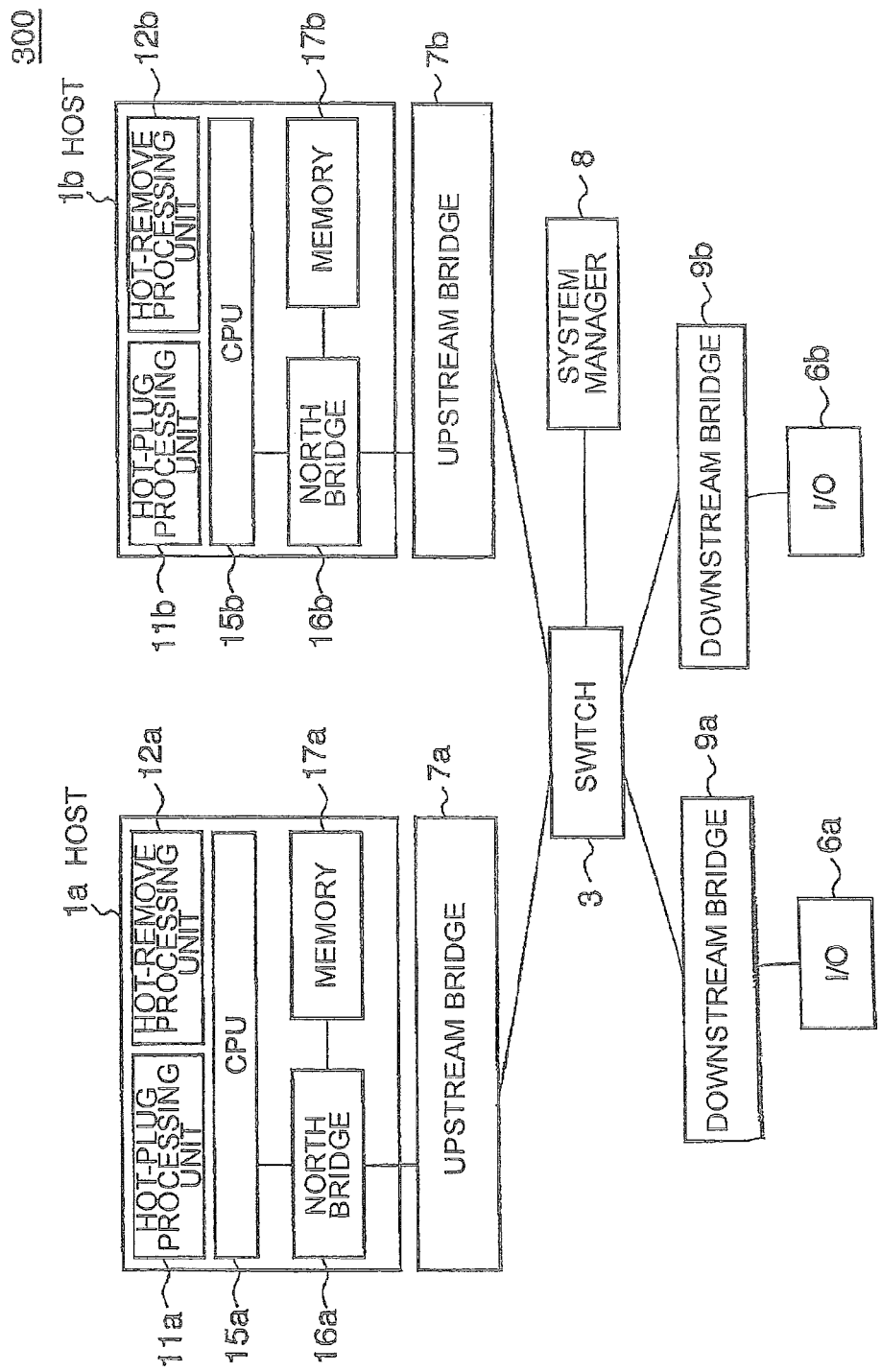
FIG. 5 is a block diagram for explaining a conventional I/O connection system 300.

According to the first embodiment, the hot-plug start flags 21a and 21b are implemented in the upstream bridges 2a and 2b, respectively. In contrast, in an I/O connection system 200 constituting a second embodiment of this invention, as shown in FIG. 4, a hot-plug start flag 171a is implemented in a memory 17a and a hot-plug start flag 171b is implemented in a memory 17b.

The hot-plug start flag 171a is mapped in memory space of a hot-plug synchronization unit 13a. Therefore, no context switch cost is generated when the hot-plug synchronization unit 13a polls the hot-plug start flag 21a. Likewise, the hot-plug start flag 171b is mapped in memory space of a hot-plug synchronization unit 13b, and hence no context switch cost is generated when the hot-plug synchronization unit 13b polls the hot-plug start flag 21b.

Although this invention has been described based on the first and second embodiments, it is to be understood that the invention is not limited to these embodiments, but various variations thereto will occur to those skilled in the art.

For example, in the first and second embodiments, the description has been made in terms of an I/O connection system connecting two hosts and two I/Os. However, the invention is applicable to any other system as far as it has three or more hosts and one or more I/Os.

Further, in the first and second embodiments, the description has been made in terms of a system in which the Ethernet (registered trademark) is used as network means for connecting hosts and I/Os. However, the invention is not limited to this but other network means may be used as long as it provides equivalent functions.

This application is based upon and claims the benefit of priority from Japanese Patent Application No. 2008-139315, filed May 28, 2008, the disclosure of which is incorporated herein in its entirety by reference.

The invention claimed is:

1. An I/O connection system comprising a plurality of hosts interconnected via a network, and one or more Input/Output ports (I/Os), the I/O connection system comprising:
  hot-plug processing means for executing a hot-plug processing comprising a plurality of processing steps for connecting an I/O of said one or more I/Os to the host;
  stop instruction means for instructing the hot-plug processing means to stop the hot-plug processing in response to a completion by the hot-plug processing means of a first phase of the hot-plug processing comprising predetermined one or more processing steps in the hot-plug processing;
  detection means for detecting that a connection between the host and the I/O has been established and the host has been enabled to access the I/O; and
  start instruction means for instructing, in response to the detection by the detection means, the hot-plug processing means to start a second phase of the hot-plug processing comprising processing steps other than said steps of the first phase of the hot-plug processing,
  wherein the first phase of the hot-plug processing comprises turning on a power supply to said I/O.

2. The I/O connection system as claimed in claim 1, wherein:
  the I/O connection system comprises a processing device operating according to a loaded program, and a start instruction program causing the processing device to operate as the start instruction means;
  the detection means updates a flag mapped in a same address space as the start instruction program; and
  the start instruction means instructs to start the second phase of hot-plug processing in response to the flag.

3. The I/O connection system as claimed in claim 1, wherein:
  the I/O connection system comprises a processing device operating according to a loaded program, and a hot-plug processing program causing the processing device to operate as the hot-plug processing means; and
  the processing device performs an exclusive control at least during an execution of the second phase of the hot-plug processing.

4. An I/O connection system comprising a plurality of hosts interconnected via a network, and one or more Input/Output ports (I/Os), the I/O connection system comprising:
  first detection means for detecting that, in a hot-remove processing performed between a first host and an I/O of said one or more I/Os, a part of the hot-remove processing performed by the first host accessing the I/O has been completed;
  host switching means for switching a connection destination of the I/O from the first host to a second host different from the first host, in response to the detection by the first detection means;
  means for starting a hot-plug processing between the second host and the I/O prior to a completion of an entirety of the hot-remove processing in the first host;
  stop means for stopping the hot-plug processing upon detecting completion of a part of the hot-plug processing that is performed by the second host without accessing the I/O;
  second detection means for detecting that the second host has been enabled to access the I/O; and
  means for resuming the hot-plug processing that has been stopped by the stop means, in response to the detection by the second detection means,
  wherein said part of the hot-plug processing comprises turning on a power supply to said I/O.

5. The I/O connection system as claimed in claim 4, the I/O connection system comprising:
  an upstream relay device for connecting the host and the network, performing a data communication with the host using a first protocol and performing a data communication with the network using a second protocol; and
  a downstream relay device for connecting the I/O and the network, performing data communication with the network using the second protocol and performing data communication with the I/O using the first protocol;
  wherein:
  the upstream and downstream relay devices establish the connection to the host and the I/O by tunneling the first and second protocols; and
  the connection between the host and the I/O is switched by changing a combination between the host and I/O to be tunneled.

6. The I/O connection system as claimed in claim 4, further comprising control means for instructing a host from which the I/O is to be hot-removed to start hot-remove processing, while transmitting a signal notifying of a host to which the I/O is assigned next and transmitting, to the host to which the I/O is assigned next, a signal to instruct to start hot-plug processing.

7. The I/O connection system as claimed in claim 4, wherein:
  the first host comprises a first processing device operating according to a loaded program, and a first detection program for causing the first processing device to operate as the first detection means, the first detection program outputting a detection result by asserting a hot-remove notification flag mapped within a same address space as said program; and the second host comprises a second processing device operating according to a loaded program, and a stop program for causing the second processing device to operate as the stop means, the stop program detecting a resumption of the processing for enabling the second host to access the I/O by polling a hot-plug start flag mapped in a same address space as said stop program.

8. The I/O connection system as claimed in claim 7, further comprising:
   means for instructing the host switching means to start switching of the hosts in response to the assertion of the hot-remove notification flag; and
   means for asserting the hot-plug start flag in response to a notification of a completion of the switching of the hosts received from the host switching means.

9. The I/O connection system as claimed in claim 4, wherein the hot-remove processing from a start until a completion of the part of the processing performed by the first host accessing the I/O, and the hot-plug processing from when the second host is enabled to access the I/O until a completion thereof are performed under an exclusive control.

10. An I/O connection method of connecting a host and an Input/Output port (I/O) in an I/O connection system comprising a plurality of hosts interconnected via a network and one or more I/Os, the method comprising:
    a stopping stage in which a hot-plug processing comprising a plurality of processing steps for connecting the I/O to the host is stopped in response to a completion of a first phase of the hot-plug processing comprising predetermined one or more processing steps in the hot-plug processing;
    a detection stage in which it is detected that a connection between the host and the I/O has been established and the host has been enabled to access the I/O; and
    a starting stage in which, in response to the detection, a second phase of the hot-plug processing comprising processing steps other than said steps of the first phase of the hot-plug processing is started,
    wherein the first phase of the hot-plug processing comprises turning on a power supply to said I/O.

11. The I/O connection method as claimed in claim 10, wherein: the start of the second phase of the hot-plug processing in the starting stage is instructed by a processing device operating according to a loaded start instruction program;
    a flag mapped in a same address space as the start instruction program is updated in response to the detection in the detection stage; and
    the processing device instructs to start the second phase of the hot-plug processing in response to the flag.

12. The I/O connection method as claimed in claim 10, wherein: the hot-plug processing is executed by a processing device operating according to a loaded program, and a hot-plug processing program for causing the processing device to execute the hot-plug processing; and
    the processing device performs an exclusive control at least during an execution of the second phase of the hot-plug processing.

13. An I/O connection method of connecting a host and an Input/Output port (I/O) in an I/O connection system comprising a plurality of hosts interconnected via a network and one or more I/Os, the I/O connection method comprising:
    a first detection stage in which it is detected that, in a hot-remove processing performed between a first host and the I/O, a part of the hot-remove processing that is performed by the first host accessing the I/O has been completed;
    a host switching stage in which a connection destination of the I/O is switched from the first host to a second host different from the first host, in response to the detection in the first detection stage;
    a stage in which a hot-plug processing between the second host and the I/O is started prior to a completion of an entirety of the hot-remove processing in the first host;
    a stopping stage in which the hot-plug processing is stopped upon detecting that a part of the hot-plug processing that is performed without the second host accessing the I/O has been completed;
    a second detection stage in which it is detected that the second host has been enabled to access the I/O; and
    a stage in which the hot-plug processing stopped in the stopping stage is resumed, in response to the detection in the second detection stage,
    wherein said part of the hot-plug processing comprises turning on a power supply to said I/O.

14. The I/O connection method as claimed in claim 13, wherein:
    the host and the network are connected by means of an upstream relay device which connects the host and the network, while performing data a communication with the host by using a first protocol and a performing data communication with the network by using a second protocol;
    the I/O and the network are connected by means of a downstream relay device which performs a data communication with the network by using the second protocol and performs a data communication with the I/O by using the first protocol;
    the upstream and downstream relay devices establish a connection between the host and the I/O by tunneling the first and second protocols; and
    the connection between the host and the I/O is switched by changing a combination between the host and the I/O to be tunneled.

15. The I/O connection method as claimed in claim 13, further comprising:
    a stage in which a control device for controlling a connection of the I/O in the I/O connection system instructs a host from which the I/O is to be hot-removed to start a hot-remove processing, while transmitting a signal notifying of a host to which the I/O is to be assigned next; and
    a stage in which the control device transmits a signal to the host to which the I/O is to be assigned next, to instruct to start the hot-plug processing.

16. The I/O connection method as claimed in claim 13, wherein:
    the first detection stage is executed by the first host which comprises a first processing device operating according to a loaded program, and a first detection program for causing the first processing device to execute the first detection stage, the program outputting a detection result by asserting a hot-remove notification flag mapped in a same address space as said program; and
    the stopping stage is executed by the second host which comprises a second processing device operating according to a loaded program, and a stop program causing the second processing device to execute the stopping stage, the program detecting resumption of processing for enabling the second host to access the I/O by polling a hot-plug start flag mapped in a same address space as said program.

17. The I/O connection method as claimed in claim 16, wherein:

the host switching stage is started in response to said assertion of the hot-remove notification flag by assuming said assertion as the detection in the first detection stage; and the I/O connection method further comprises a stage in which the hot-plug start flag is asserted in response to a completion of the switching of the host.

18. The I/O connection method as claimed in claim 13, wherein the hot-remove processing from a start until part of the processing performed with the first host accessing the I/O has been completed and the hot-plug processing from when the second host is enabled to access the I/O until a completion thereof are performed under an exclusive control.

* * * * *